United States Patent [19]

Nagano et al.

[11] Patent Number: 4,504,943
[45] Date of Patent: Mar. 12, 1985

[54] TIME DOMAIN MULTIPLEXER

[75] Inventors: Katsuyuki Nagano, Nishitama; Yasushi Takahashi, Hachioji; Yoshitaka Takasaki, Tokorozawa; Mitsuo Tanaka, Ohme, all of Japan

[73] Assignee: Hitachi, Ltd., Tokyo, Japan

[21] Appl. No.: 408,806

[22] Filed: Aug. 17, 1982

[30] Foreign Application Priority Data

Aug. 21, 1981 [JP] Japan ................................ 56/130096

[51] Int. Cl.³ .............................................. H04J 3/00
[52] U.S. Cl. ........................................ 370/79; 370/84; 370/112
[58] Field of Search ........................... 370/84, 112, 79

[56] References Cited

U.S. PATENT DOCUMENTS

| 3,982,074 | 10/1976 | Clark | 370/84 |
| 3,982,077 | 10/1976 | Clark et al. | 370/84 |
| 4,168,401 | 10/1979 | Molleron et al. | 370/84 |
| 4,215,245 | 7/1980 | Bellisio | 370/84 |
| 4,258,434 | 3/1981 | Glowinski et al. | 370/84 |
| 4,287,591 | 10/1981 | Strehl | 370/84 |
| 4,330,689 | 5/1982 | Kang et al. | 370/84 |
| 4,330,856 | 5/1982 | Takasaki et al. | 370/84 |
| 4,410,980 | 10/1983 | Takasaki et al. | 370/84 |

FOREIGN PATENT DOCUMENTS 0054120 6/1982 European Pat. Off. ............ 370/112

Primary Examiner—Douglas W. Olms
Assistant Examiner—Kenneth I. Rokoff
Attorney, Agent, or Firm—Antonelli, Terry & Wands

[57] ABSTRACT

In order to enhance the general purposeness of a time domain multiplexer for digital channel signals of unequal bit rates, the time domain multiplexer is constructed of a plurality of channel units which provide information signals and bit rate signals of input channel signals, a plurality of logic circuits which multiplex the information signals from the channel units, and a control circuit which selects and combines the logic circuits in accordance with the bit rate signal so as to construct a multiplexer conforming with the bit rate.

7 Claims, 8 Drawing Figures

TIME DOMAIN MULTIPLEXER

BACKGROUND OF THE INVENTION

The present invention relates to a time domain multiplexer, and more particularly to the arrangement of a multiplexer for use in a system in which a plurality of digital channel signals including channel signals of unequal bit rates are subjected to time domain multiplexing and then are transmitted.

One of the advantages of digital signal transmission is that a plurality of information (channel signals) can be transmitted through a single transmission line in a time-domain-multiplexed fashion and that economy can be attained by sharing the transmission line and circuit devices. In order to perform time domain multiplexing, however, the bit rates of the respective channel signals must have a fixed relationship. In particular, in case of multiplexing a plurality of channel signals whose bit rates are extremely different, for example, differing by several times to several tens of times, a multiplexing system of the so-called hierarchic structure is needed. As will be explained in detail later, hierarchic multiplexing is performed in such a way that signals of a plurality of channels having equal bit rates are subjected to time domain multiplexing, the multiplexed signal is multiplexed with signals of another channel, or another time-domain-multiplexed signal having a bit rate equal to the bit rate of the former signal, into a time-domain-multiplexed signal having a still higher rate (being, for example, double the bit rate), and such time-domain-multiplexing operations are then hierarchically combined.

In case of carrying out the multiplexing hierarchy method as described above, a time domain multiplexer must be designed for adaptation to a particular transmission system, i.e., to take into consideration the number and bit rates of the channel signals to be multiplexed. However, it is uneconomical and forms a cause for high cost that a special time domain multiplexer must be designed and fabricated for every transmission system. When the apparatus of this type is constructed of a large-scale integrated circuit (LSI) with the intention of providing the time domain multiplexer as a general-purpose device which is applicable to different multiplexing transmission systems, exclusive circuits corresponding to various bit rates must be additionally provided so that the various bit rates can be accommodated. This results in a bulky apparatus or a low transmission efficiency. Conversely, when an exclusive multiplexing apparatus is fabricated for a specific multiplexing transmission system, the transmission efficiency is enhanced, but the general-purpose applicability thereof is lost. In case the degree of multiplexing of a previously-used channel has changed or the bit rate has changed, it is required on occasion to alter the connections or to change the exclusive multiplexing apparatus to a significant extent.

SUMMARY OF THE INVENTION

It is accordingly an object of the present invention to realize as a general-purpose apparatus a multiplexing apparatus for use in a system wherein signals of a plurality of channels including channel signals whose bit rates differ at least an integral number of times are multiplexed and transmitted. More specifically, the object is to realize a time domain multiplexer which can automatically perform hierarchic multiplexing in accordance with the rates of applied transmission signals.

To the end of accomplishing these objects, the present invention is characterized by a time domain multiplexer including a plurality of channel units to which a plurality of channel signals to be multiplexed are applied. The channel units adjust the input signals in order to turn them into signals suitable for multiplexing. They convert the input signals into signals having a period which is an integral number times longer than the bit period of a multiplexed signal, or they adjust the the phases when the input signals have such rate already at the time of the input operation. At least one of the channel units is to constructed as to generate the converted information (data) signal of the input channel signal and also a bit rate signal representative of the rate of the information signal. The system further includes a multiplexer which is constructed of logic circuits that subject the information signals from the plurality of channel units to time domain multiplexing; and a control circuit which selects and controls the logic circuits of the multiplexer in dependence on the bit rate signal so as to cause the multiplexer to conform with the required bit rate.

In a preferable aspect of performance of the multiplexer, as will be explained in conjunction with a preferred embodiment, multiplexer units which are constructed of logic circuits and whose degrees of multiplexing are in a mutual hierarchic relationship are arranged in cascade from an input side to an output side, and input circuits to the respective multiplexer units, providing the information signals from the channel units are controlled by signals from the control circuit.

The "degree of multiplexing" is defined herein as the number of channels which can be multiplexed within one frame of the multiplexed signal. In addition, the "hierarchic relationship" signifies the relationship in which the degree of multiplexing at a succeeding stage is an integral number of times higher than that at a preceding stage.

The channel unit which provides the information signal and the bit rate signal may be a mere repeater of signals in a case where the bit rate signal is produced from the input channel signal and also where the bit rate signal is already generated in a channel signal source.

Regarding the expression "unequal bit rates", it is ideally desired that the relation of integral number times the basic bit rate (clock frequency) T exists. Even in case of arbitrary rates, however, the present invention is similarly applied in such a way that the rates are converted into rates which are an integral number times T by addition of a rate converting circuit.

According to the present invention, as will be explained in conjunction with the preferred embodiments, when bit rates are in a hierarchic relationship, for example, $T_1$, $T_2(=T_1{}^2)$, $T_3(=T_1{}^3)$ ..., the channel signals of the rates $T_i (i-1, 2 ...)$ can be connected to any of the channel units of or above $T_i$. This has the effect of expanding the usage of the time domain multiplexer and enhancing the general-purpose aspect of the apparatus.

These and other objects and features of the present invention will become more apparent from the following description to be read in conjunction with the accompanying drawings.

DETAILED DESCRIPTION OF THE PREFERRED EMBODIMENTS

Hereunder, the present invention will be described in detail with reference to the drawings.

Figure 1:
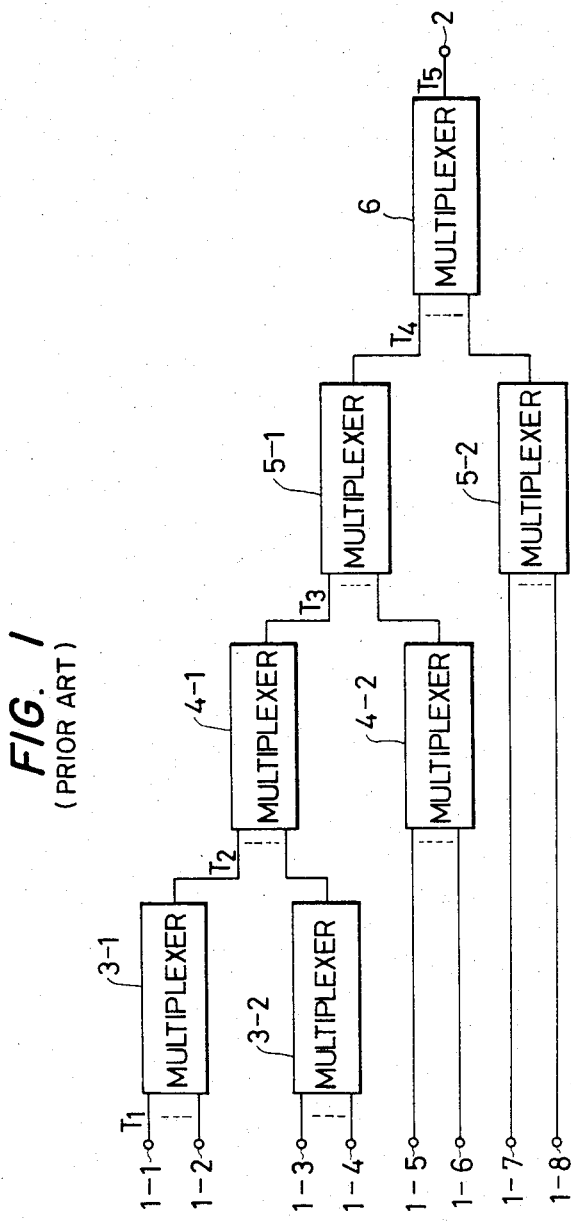
FIG. 1 is a conceptual diagram for explaining the arrangement of a hierarchic multiplexer.

FIG. 1 shows the conceptual construction of a time domain multiplexer for a plurality of channels as based on a prior-art hierarchic structure, in order to facilitate understanding of the present invention. It illustrates a case where four different channels having bit rates $T_1$, $T_2$, $T_3$ and $T_4$ are subjected to time domain multiplexing into a time-domain-multiplexed signal having a bit rate $T_5$. As illustrated in the figure, the channels 1-1, 1-2 and 1-3, 1-4 having the bit rate $T_1$ are respectively applied to multiplexers 3-1 and 3-2 exclusive for the bit rate $T_1$, to become multiplexed signals having the bit rate $T_2$. The two multiplexers are provided here to show a situation where the channels cannot be multiplexed with a single multiplexer on account of the degree of multiplexing. The two multiplexed signals having the bit rate $T_2$ are turned into a multiplexed signal having a bit rate $T_3$ by a multiplexer 4-1. Further, the output signal of the multiplexer 4-1 is multiplexed by a multiplexer 5-1 with a signal having a bit rate $T_3$ obtained by multiplexing a plurality of channels having the bit rate $T_2$ at input terminals 1-5, 1-6 by means of a multiplexer 4-2, and this produces a multiplexed signal having a bit rate $T_4$. Likewise, signals having a bit rate $T_3$ at input terminals 1-7, 1-8 are converted to a bit rate $T_5$ by multiplexers 5-2 and 6, so that the finally multiplexed signal is delivered from an output terminal 2 to a transmission line.

As described above, according to the prior art hierarchic structure, the input terminals are fixed in correspondence with the bit rates. Therefore, some parts are not used in dependence on the bit rates of the input channels to be multiplexed. For example, it is impossible to connect the channel signals of the bit rate $T_1$ to the input terminals 1-5 to 1-8 or to connect the channel signals of the bit rate $T_2$ to the input terminals 1-2 to 1-4 or 1-7, 1-8. Moreover, connections must be altered for some intended uses, and therefore, it is clear that the time domain multiplexer lacks in general usefulness.

Figure 2:
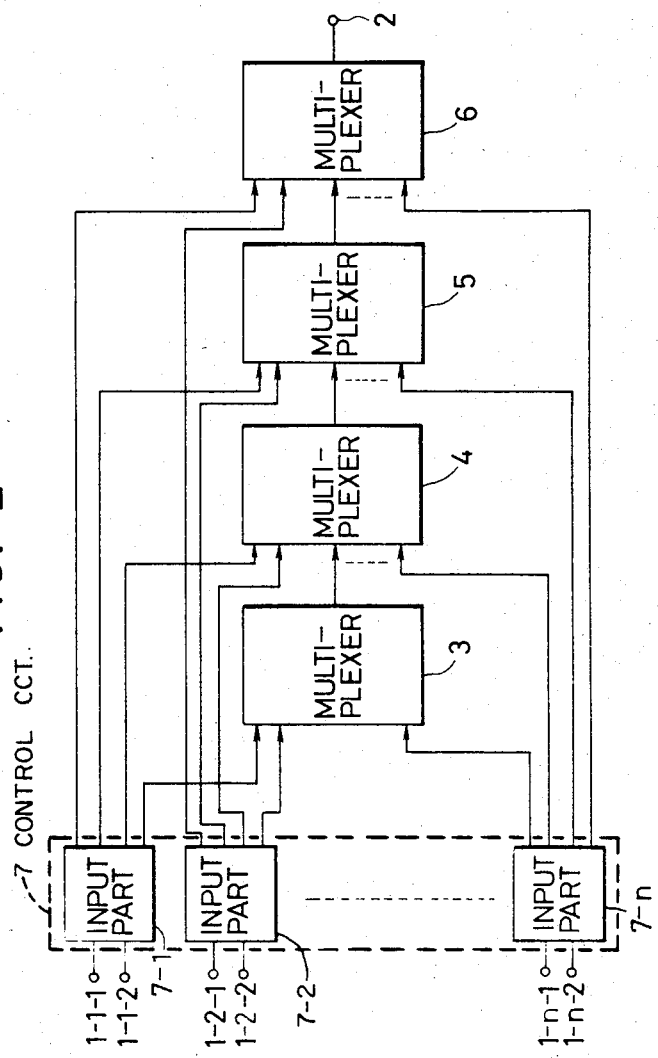
FIG. 2 is a block diagram showing the arrangement of an embodiment of a time domain multiplexer according to the present invention.

FIG. 2 is a diagram which shows the principle arrangement of a time domain multiplexer according to the present invention. In the present invention, the input parts 7-1, 7-2 . . . and 7-n of the respective channels of the time domain multiplexer are provided with control circuits for switching the applied flows of data information in dependence on the bit rate (applied to terminals 1-1-2, 1-2-2 . . . and 1-n-2) of these channel signals, so as to select and connect these signals to the appropriate one of multiplexers 3, 4, 5 and 6 whose degrees of multiplexing increase hierarchically from the input side to the output side. However, the bit rate signals need not be applied to the input parts of all the channels, and input parts which have fixed bit rates and which have no switching circuit may well be included.

As apparent from the above arrangement, channel signals of various bit rates can be connected to each input part, so that the time domain multiplexer is applicable to various multiplexing systems and has its general usefulness enhanced.

Letting $m_1$, $m_2$, $m_3$ and $m_4$ denote the degree of multiplexing of the respective multiplexers 3, 4, 5 and 6 and $T_1$, $T_2$, $T_3$ and $T_4$ denote the bit rates of the input signals, the relation of $m_1T_1+m_2T_2+m_3T_3+m_4T_4<T_5$ is naturally required. Therefore, the sum of the bit rates of the channel signals to be applied to the input parts of the respective channels needs to be smaller than the bit rate of a signal from an output terminal 2.

Figure 3:
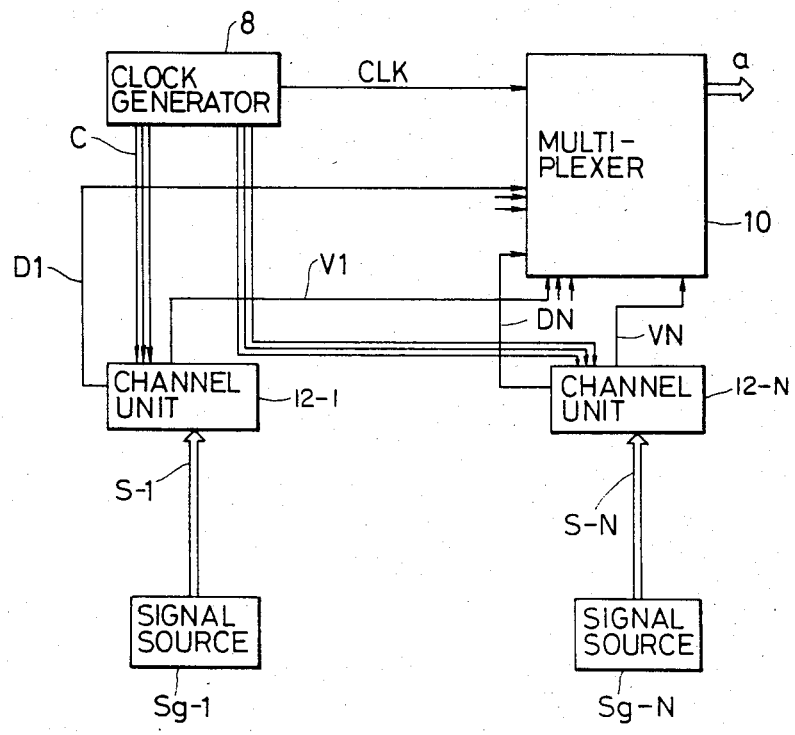
FIGS. 3 and 4 are block diagrams of embodiments of the transmitting portion and receiving portion of a multiplexing transmission system which employs the time domain multiplexer according to the present invention, respectively.
Figure 4:
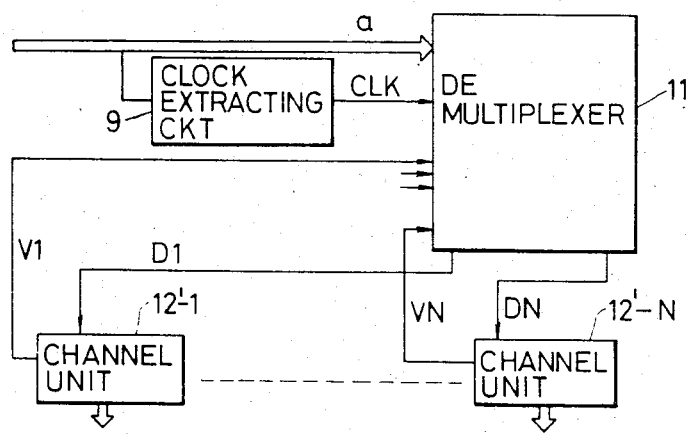

FIGS. 3 and 4 are diagrams showing the arrangements of embodiments of a multiplexing portion, and the separating part of a receiving portion in a time domain multiplexing system which employs the time domain multiplexer according to the present invention, respectively. The present embodiment corresponds to a case where the bit rates of the signals of a plurality of channels to be multiplexed are arbitrary. It is so constructed that, in order to permit hierarchic multiplexing, the signals have their rates changed into signals of a rate which is higher than the bit rates of the channel input signals and which is closest to one of the bit rates $T_1$, $T_2$ . . . and $T_n$, whereupon the multiplexing operation may be carried out. In FIG. 3, signals S-1, S-N from signal sources Sg-1 to Sg-N of a plurality of channels having arbitrary bit rates are respectively applied to channel units 12-1 to 12-N. These channel units select optimum rates from among a plurality of rate information C afforded from a clock generator 8. They generate information signals D1–DN and bit rate signals V1–VN converted in accordance with the rates, and apply them to a multiplexer 10. The clock generator 8 incldes an oscillator for generating a clock signal CLK of high rate, and prepares the clock signals C of the plurality of rates by dividing the frequency of the clock signal CLK.

The clock signal CLK is also used as a timing signal required for the operations of the multiplexer 10.

In the receiving portion (FIG. 4), the multiplexed signal a is applied to a demultiplexer 11 for separating the plurality of multiplexed channel signals. A clock extracting circuit 9 extracts the clock signal CLK from the multiplexed signal, and applies it to the demultiplexer 11 as a timing signal required for the operation of the demultiplexer. Owing to an arrangement to be described later, the demultiplexer 11 separates the information signals D1–DN of the respective channels, which are respectively applied to channel units 21-1 to 12-N and decoded into the original signals. The respective channel units 12'-1 to 12'-N are supplied with control signals V1–VN indicative of the rates, which are applied to the demultiplexer 11.

Now the arragements and operations of the various parts of the above-described embodiment will be explained.

Figure 5:
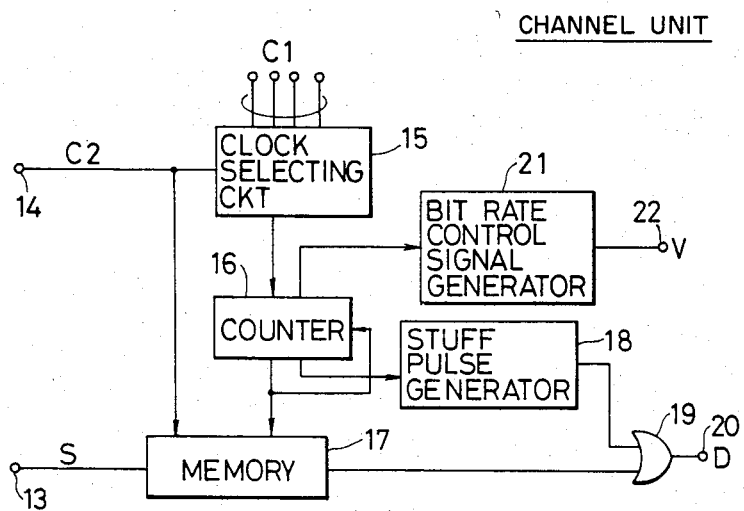
FIG. 5 is a block diagram of an embodiment of a channel unit for use in FIG. 3.

FIG. 5 is a diagram showing the arrangement of one of the channel units 12 in FIG. 3. Signals S of arbitrary bit rates $T_s$ are applied to an input terminal 13, and are stored in a memory 17. A timing signal C2 for the signals S is applied to an input terminal 14, and it is applied to a clock selecting circuit 15 and also serves as a control signal for the writing of the signal S into the memory 17. The clock selecting circuit 15 is supplied with a plurality of clock signals C1, as seen in FIG. 3, from among which a clock signal having a rate closest to the clock C2 and higher than the clock C2 is selected. On the basis of the selected clock signal, a counter 16 reads out the information signals from the memory 17 in which the signals S have been stored. In addition, when the counter has read out the signals in a fixed number (the number of pulses within a frame), it ceases the provision of read-out pulses and causes a stuff pulse generator 18 to produce stuff pulses (which are constructed of pulses in a code pattern not appearing in any information, so as to be discernible from the information signals). Accordingly, the stuff pulses are added to the information signals through an AND circuit 19, and signals D of fixed bit rates (corresponding to D1–DN in FIG. 3) are provided from an output terminal 20. The outputs of the counter 16 are partly applied to a bit rate control signal generator 21 so as to provide from an output terminal 22 bit rate control signals V (corresponding to V1–VN in FIG. 3) corresponding to the rates of the signals D. In some cases where selection from more than two possible bit rates is to be made, the generator 21 may have more than one output line.

Figure 6:
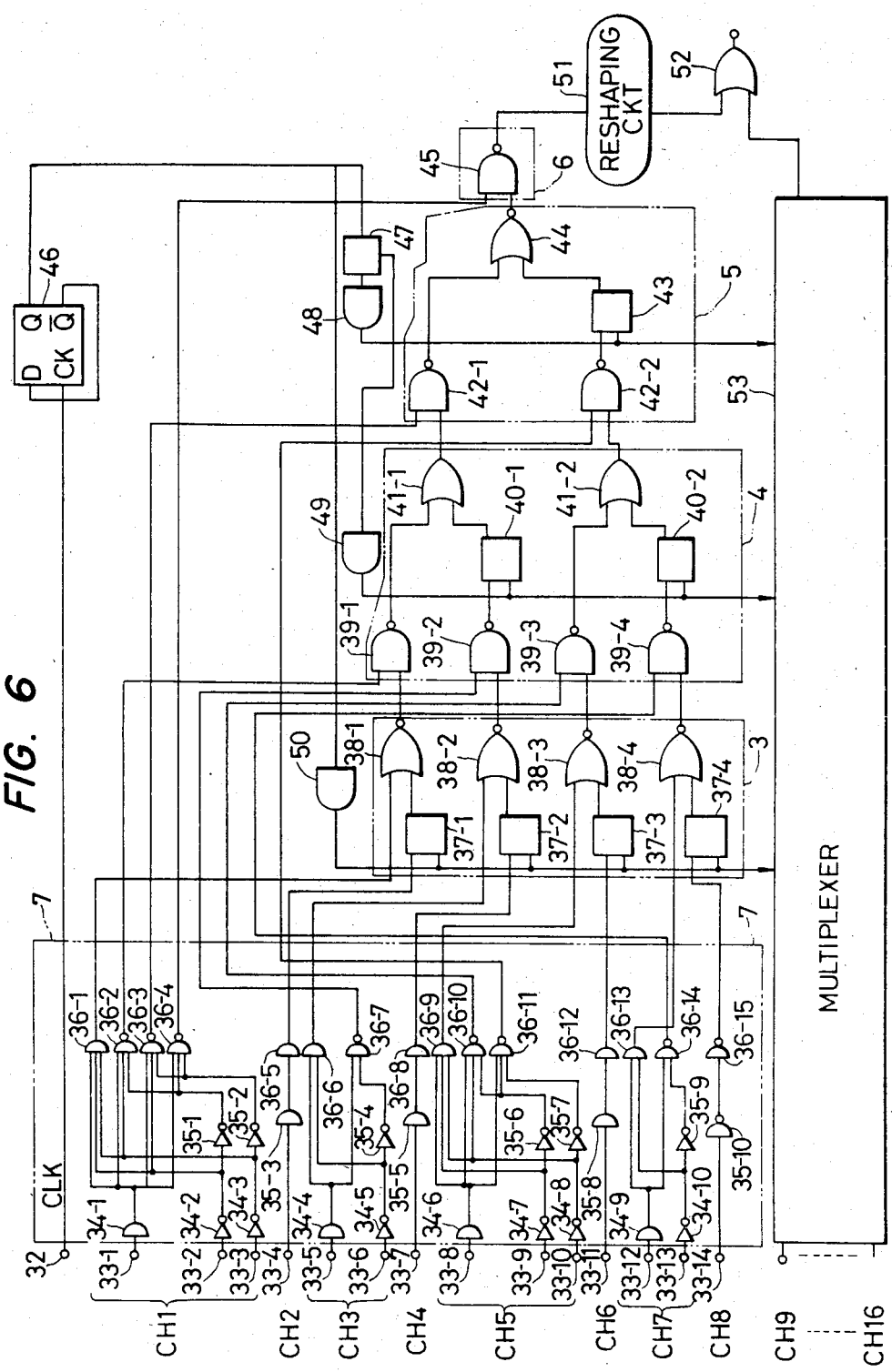
FIG. 6 is a circuit diagram of the time domain multiplexer according to FIG. 2.

FIG. 6 is a circuit diagram showing the arrangement of an embodiment of the multiplexer 10 in FIG. 3. In the figure, blocks 7, 3, 4, 5 and 6 indicated by dotted lines are switching circuits for selecting the multiplexers and the multiplexers identified by the same numerals in FIG. 2, respectively.

In the present embodiment, there are input terminals (channel units) for 16 channels CH1–CH16, and the bit rates to the multiplexer are $T_1$, $T_2(=2T_1)$, $T_3(=2T_2)$ and $T_4(=2T_3)$.

The channels CH1 and CH9 can be supplied with signals of all the bit rates $T_1$, $T_2$, $T_3$ and $T_4$. The channels CH5 and CH13 can receive signals of the bit rates $T_1$, $T_2$ and $T_3$. The channels CH3, CH7, CH11 and CH15 can connect signals of the bit rates $T_1$ and $T_2$. The channels CH2, CH4, CH6, CH8, CH10, CH12, CH14 and CH16 can connect signals of only the bit rate $T_1$, so that the input terminals of these channels receive no rate control signal. Since the channels CH9–CH16 are constructed to be quite identical to the channels CH1–CH8, they will not be described in particular. Hereunder, the channels CH1–CH8 will be described.

In the first channel CH1, an information (data) signal is applied to an input terminal 33-1 and is divided into four signals at the output of an AND circuit 34-1, and the divided signals are respectively applied to an AND gate 36-1 and NAND gates 36-2, 36-3 and 36-4. Input terminals 33-2 and 33-3 are bit rate control signal input terminals for the channel CH1, and the control signals cont$_{01}$ and cont$_{10}$ applied to these input terminals provide the states (0, 0), (1, 0), (0, 1), and (1, 1) allotted to the bit rates $T_1$, $T_2$, $T_3$ and $T_4$, respectively. When the bit rate is $T_1$, the outputs of inverters 34-2 and 34-3 become "1", to enable only the AND gate 36-1 and to impress the information signal on a NOR gate 38-1. Likewise, when the rate control signals are (1, 0), (0, 1) and (1, 1), the corresponding ones of the NAND gates 36-2, 36-3 and 36-4 are selected by inverters 34-2, 34-3, 35-1 and 35-2, and the information signals are respectively impressed on NAND gates 39-1, 42-1 and 45. This signifies that the information signals are directly applied to the multiplexers for the bit rates $T_2$, $T_3$ and $T_4$. The channel CH2 includes no bit rate signal, and an information signal applied to an input terminal 33-4 is impressed on a shift register 37-1 via AND gates 35-3 and 36-5, which serve to provide a required delay in time.

In the channel CH3, an information signal is applied to a terminal 33-5, and a bit rate signal to a terminal 33-6. As the bit rate signal, the logical level signal of "0" is applied for the rate $T_1$ and that of "1" for the rate $T_2$, and only the signals of the two rates can be coupled. AND gates 36-6 and 36-7 are driven by inverters 34-5 and 35-4. A terminal 33-7 is supplied with signals of only the rate $T_1$. AND circuits 35-5 and 36-8 serve to adjust for the proper delay.

Signals of the rates $T_1$, $T_2$ and $T_3$ can be connected to the channel CH5. A terminal 33-8 is an information input terminal; terminals 33-9 and 33-10 are rate signal input terminals; elements 34-7, 34-8, 35-6 and 35-7 are inverters; element 36-9 is an AND gate; and elements 36-10 and 36-11 are NAND gates. Signals of only the bit rate $T_1$ can be coupled to the channel CH6 which includes an input terminal 33-11 and AND circuits 35-8 and 36-12 for the adjustment of a proper delay time. The channel CH7 has an arrangement similar to that of the channel CH3 wherein 33-12 indicates an information input terminal, 33-13 a bit rate signal input terminal, 34-10 and 35-9 inverters, 36-13 an AND gate, and 36-14 a NAND gate; and signals of the rates $T_1$ and $T_2$ can be coupled thereto. The channel CH8 has an arrangement similar to that of the channel CH2 wherein 33-14 indicates an input terminal, and 35-10 and 36-15 NAND circuits for the adjustment of a delay time; and signals of only the rate $T_1$ can be coupled thereto.

When all the rates of the information signals applied to the channels CH1–CH8 are $T_1$, the signals of the channels CH1, CH3, CH5 and CH7 are directly applied to NOR circuits 38-1, 38-2, 38-3 and 38-4 respectively, and the signals of the channels CH2, CH4, CH6 and CH8 are applied to shift registers 37-1, 37-2, 37-3 and 37-4 respectively. The shift registers are driven by a clock signal produced in such a manner that the clock signal CLK from a clock input terminal 32 is fed via a ½ frequency divider 46 constructed of a flip-flop, and they delay the input signals by ½ period of the rate $T_1$. An AND circuit 50 is a circuit for adjusting the delay time. The outputs of the NOR circuits 38-1 and 38-3 are applied via NAND circuits 39-1 and 39-3 and directly applied to OR circuits 41-1 and 41-2, respectively, while the outputs of the NOR circuits 38-2 and 38-4 are applied via NAND circuits 39-2 and 39-4 to the OR circuits 41-1 and 41-2 after having been delayed by ¼ period of the rate $T_1$ by means of shift registers 40-1 and 40-2, respectively. Since the NAND circuits 39 receive negative logic inputs, OR circuits (i.e., adder circuits) may be considered with positive logic signals. The shift registers 40 are driven by a clock signal with its delay time adjusted by means of a shift delay circuit 47 and an AND circuit 49, and they delay the input signals by ¼ period of the rate $T_1$. Similarly, the outputs of the OR circuits 41-1 and 41-2 are applied to a NOR circuit 44 via the NAND circuit 42-1 and via a NAND circuit 42-2 as well as a shift register 43, respectively. The shift register 43 delays its input by ⅛ period of the rate $T_1$ by the use of a clock signal with its delay time adjusted by means of the delay circuit 47 and an AND circuit 48. Accordingly, the output of the NOR circuit 44 becomes a combined signal with the signals of the channels CH1–CH8 subjected to time domain multiplexing. When the same circuit arrangement 53 as that of the channels CH1–CH8 is further provided and its output is applied to an OR circuit 52 along with the output of the NOR circuit 44 applied through the NAND circuit 45, the time-domain-multiplexed signal of the 16 channels is obtained. Numeral 51 indicates a reshaping circuit, which is provided because of the necessity for narrowing the pulse width on account of a high degree of multiplexing.

Figure 7:
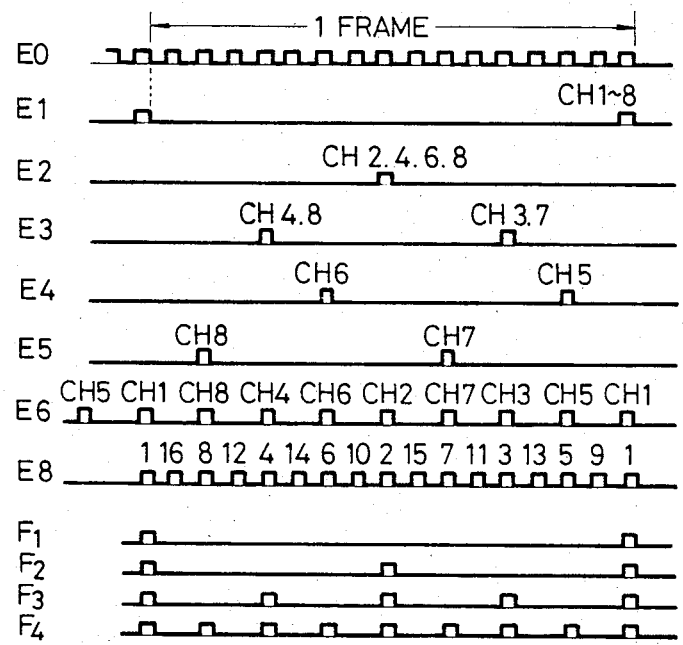
FIG. 7 is a time chart for explaining the operations of the embodiment in FIG. 6.

FIG. 7 illustrates the time relations of the respective channel signals in FIG. 6, specifically the situation in one frame in the case where signals of the rate $T_1$ are applied to all the 16 channels and multiplexed. Referring to the figure, E0 indicates a timing signal at the multiplexing of the 16 channels; E1, E2, E3, E4 and E5 indicate the time relations of the respective channel signals forming the inputs and outputs of the multiplexers 3, 4 and 5; and the outut of the multiplexer 5 becomes as shown at E6. When this output is further multiplexed with a similar multiplexed signal of the channels CH9–CH16, a signal in which the channels are arrayed as shown at E8 is obtained. The numerals over the pulses in the figure indicate the Nos. of the channels.

In the above, there has been described the case where all the bit rates are $T_1$. In this case, the signals may be connected to any of the channels CH1–CH16.

Signals of the bit rate $T_2$ can be connected to the channels CH1, CH3, CH5 and CH7, signals of the rate $T_3$ can be connected to the channels CH1 and CH5, and signals of the rate $T_4$ may be connected to the channel CH1. Of course, the signals may be connected to any of the channels so each of the channels is provided with the appropriate bit rate control information terminals and the gates corresponding to bit rates $T_1$–$T_4$ as in the channel CH1. However, when it is known beforehand that many signals of low rates are used, the construction according to the embodiment of FIG. 6 is most desirable from the viewpoint of simplicity in the circuit arrangement.

In case of the embodiment of FIG. 6, when the first channel is referred to by way of example, the information signals occupy time slots as indicated at F1, F2, F3 and F4 in FIG. 7 with respect to the bit rates $T_1$, $T_2$, $T_3$ and $T_4$, respectively. Therefore, the input terminal 33-4 of the second channel cannot be supplied with signals of the other channels when the rate is $T_2$, the input terminals of the second, third and fourth channels cannot be supplied with signals of the other channels when the rate is $T_3$, and the input terminals of the second to eighth channels cannot be supplied with channel signals when the rate is $T_4$. Likewise, when channel signals of the rate $T_2$ are connected to any of the channels CH3, CH5 and CH7, it is necessary to prevent channel signals from being connected to the respectively lower channel CH4, CH6 or CH8. In addition, when channel signals of the rate $T_3$ are supplied to the channel CH5, the lower two channels CH6 and CH7 cannot be used.

As understood from the above embodiment, the combinations of channel signals which can be multiplexed increase, and the general purpose characteristic of the time domain multiplexer is expanded. For the sake of simplicity, as to the largest number of combinations permitting the multiplexing (a situation where signals exist in all time slots as shown at E8 in FIG. 7) with the channels CH1–CH8 in the above embodiment, one may compare the case of this embodiment with a case where the respective channels are constructed of exclusive circuits which are not controlled by bit rate signals. In the case of the exclusive circuits, the five combinations of $T_4$, $T_3+T_2\times 2$, $T_3+T_2+T_1>2$, $T_3+T_1\times 4$ and $T_2\times 2+T_1\times 4$ can be multiplexed. In the case of the embodiment, the multiplexing operations of $T_3\times 2$, $T_2\times 4$, $T_2\times 3+T_1\times 2$, $T_2+T_1\times 6$ and $T_1\times 8$ are possible besides the aforementioned combinations. $T_m\times n$ mentioned above (m=1, 2, 3 and 4, and n=1–8) indicates connection of n signals of rate $T_m$. While the above calculations indicate merely the sorts of possible combinations, it is to be understood that the number of channel combinations at an identical rate becomes much larger than in the case of use of the exclusive circuits. For example, in case of combining two signals of bit rate $T_2$, the channels to which $T_2$ can be connected are the four channels of CH1, CH3, CH5 and CH7 in the embodiment, and hence, the number of the channel combinations is $_4C_2=6$, which is higher in general applicability than 1 combination in the case where only the two channels CH3 and CH7 are exclusively used for $T_2$.

Figure 8:
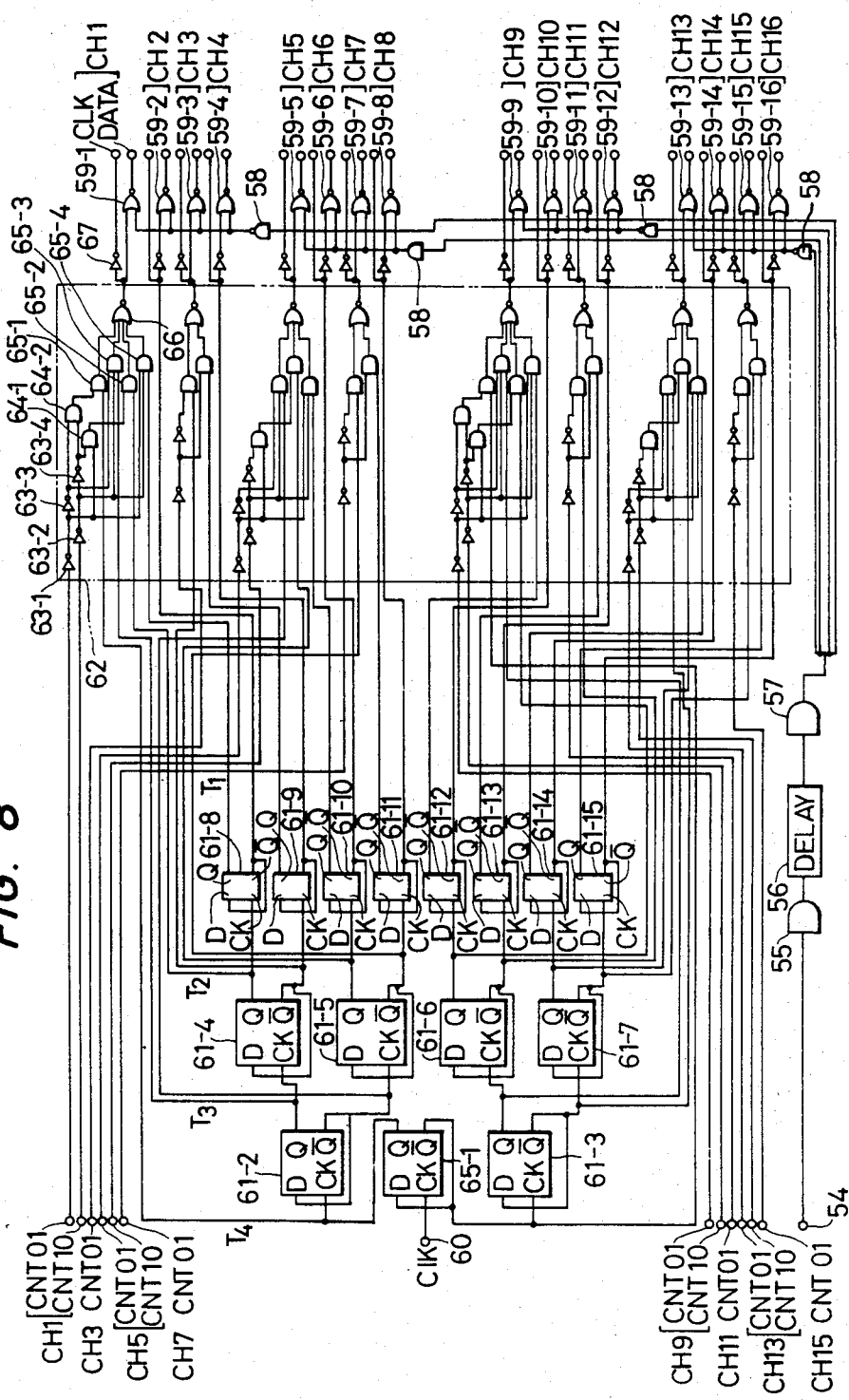
FIG. 8 is a circuit diagram of an embodiment of a demultiplexer which separates signals multiplexed by the time domain multiplexer.

FIG. 8 is a diagram showing the arrangement of a circuit which separates the channel signals subjected to time domain multiplexing by the circuit of the embodiment of FIG. 6, and which corresponds to the demultiplexer 11 in FIG. 4. The multiplexed signal a is passed via an input terminal 54, an AND circuit 55 and a delay circuit 56 for adjusting the delay time, and AND circuits 57 and 58 for adjusting fan-out numbers, and it is applied to NOR gate circuits 59-1, 59-2, 59-3, 59-4 . . . and 59-16 for separating the channel signals.

The clock signal CLK extracted from the multiplexed signal a (9 in FIG. 4) is applied to an input terminal 60, and is converted into the clock signal corresponding to the rate $T_4$ (corresponding to E0 in FIG. 7) by a ½ frequency divider constructed of a D flip-flop 61-1. It is further converted into a clock signal corresponding to the rate $T_3$ by means of frequency dividers 61-2 and 61-3 of the same construction; into a clock signal corresponding to the rate $T_2$ by means of frequency dividers 61-4, 61-5, 61-6 and 61-7; and into a clock signal corresponding to the rate $T_1$ by means of frequency dividers 61-8, . . . and 61-15. The block 62 is logic circuitry which produces gate driving signals for separating the signals of the respective channels from the clock signals of the respective frequency dividers 61-1, . . . and 61-14. The first channel CH1 will be described.

Rate control signals CONTO1 and CONTO2 which correspond to a rate to be selected are applied from the channel unit (12-1 in FIG. 4). The control signals are set in advance because the bit rates of the respective channels on the transmission side are known when the multiplexed transmission system is constructed. As explained in connection with the multiplexing circuit, logic values (cont01, cont10) are (0, 0) for the bit rate $T_1$, and (1, 0), (0, 1) and (1, 1) for bit rates $T_2$, $T_3$ and $T_4$ respectively. Accordingly, in order to produce the pulse signals as shown at F1–F4 in FIG. 7 in correspondence with the bit rates $T_1$, $T_2$, $T_3$ and $T_4$ by means of the logic circuits of inverters 63-1, 63-2, 63-3 and 63-4 and AND circuits 64-1 and 64-2, AND gates 65-4, 65-3, 65-2 and 65-1 are enabled to pass the outputs of the frequency dividers 61-8, 61-4, 61-2 and 61-1 and apply them to a NOR circuit 66, respectively. The output of the NOR circuit 66 becomes the timing signal of a negative logic signal, and it drives the NOR gate circuit 59-1 to separate the signals of the channel CH1. An inverter 67 changes the timing signal of negative logic into the clock signal of positive logic, which is applied to a signal processing circuit (not shown) for the separated channel CH1 as a clock signal. Quite the same operations are conducted as to the other channels, and the detailed explanation is omitted because the arrangements and operations will be clear from the illustrated logic circuits.

As set forth above in conjunction with the preferred embodiments, with the time domain multiplexer according to the present invention, signals of unequal bit rates can be applied to channel input terminals, so that the identical sort of time domain multiplexer can be used in different multiplexing systems. In other words, the general purposeness of the multiplexer can be enhanced. In case of realizing a multiplexer in the form of a semiconductor integrated circuit, there is the effect that the production cost can be remarkably reduced.

What is claimed is:

1. In an apparatus for time-dividing a plurality of channel signals including channel signals of unequal bit rates; a time domain multiplexer comprising
   a plurality of channel units each providing an information signal having one of a hierarchy of bit rates, and at least one of which additionally provides a bit rate indicating signal, in response to an applied channel signal; and
   multiplexer means connected to said channel units to receive said information signals and said bit rate indicating signal for subjecting information signals from said plurality of channel units to time domain multiplexing, including a plurality of multiplexer units connected in cascade, the degrees of multiplexing of which vary hierarchically in accordance with said hierarchy of bit rates, and control circuit means for selectively applying said information signals to selected multiplexer units in accordance with said bit rate indicating signal so as to multiplex said information signals in accordance with a selected hierarchy of bit rates.

2. A time domain multiplexer according to claim 1, wherein said one channel unit includes conversion means for converting the input channel signal applied thereto into an information signal having a higher bit rate than the bit rate of the applied input channel signal, the higher bit rate of the information signal corresponding to one of said selected hierarchy of bit rates, and a bit rate indicating signal representative of the bit rate of said information signal.

3. A time domain multiplexer according to claim 2, wherein said control circuit means includes a plurality of gate circuits connected to receive said information signals, respective outputs of said gate circuits being connected to respective ones of said plurality of multiplexer units having said hierarchically varying degrees of multiplexing, and means for selecting one of said gate circuits in response to said bit rate indicating signal.

4. A time domain multiplexer according to claim 3, wherein each of said plurality of multiplexer units having hierarchically varying degrees of multiplexing includes a logic circuit which receives two different signals from a channel unit or the multiplexer unit of a preceding stage and which adds one signal as it is and the other signal after being delayed by one-half period.

5. A time domain multiplexer according to claim 1, wherein said channel signal applied to at least said one channel unit includes a data signal and a timing signal indicating the bit rate of said data signal, and wherein said one channel unit comprises memory means responsive to said timing signal for storing said data signal, clock selecting means for producing a clock signal corresponding to one of said hierarchy of bit rates which is closest to the bit rate of said timing signal but of higher frequency, and counter means responsive to the clock signal from said clock selecting means for reading out the data signal from said memory means as said information signal.

6. A time domain multiplexer according to claim 5, wherein said one channel unit further comprises stuff pulse generator means responsive to said counter means for adding stuff pulses to the data signal read out of said memory means for a time equal to the difference between the frame length of said data signal at the bit rate of said timing signal and the frame length at the bit rate of said selected clock signal.

7. A time domain multiplexer according to claim 6, wherein said one channel unit further comprises bit rate control signal generator means responsive to said clock signal from said counter means for generating said bit rate indicating signal corresponding to said information signal.

* * * * *